United States Patent
Schilit et al.

(10) Patent No.: US 10,045,169 B2
(45) Date of Patent: Aug. 7, 2018

(54) SYSTEMS AND METHODS FOR PERSONALIZING PUBLIC DEVICES

(71) Applicant: Google Inc., Mountain View, CA (US)

(72) Inventors: William Noah Schilit, Mountain View, CA (US); Roy Want, Los Altos, CA (US); Mark Sobaszek, Waterloo (CA)

(73) Assignee: Google LLC, Mountain View, CA (US)

( * ) Notice: Subject to any disclaimer, the term of this patent is extended or adjusted under 35 U.S.C. 154(b) by 98 days.

(21) Appl. No.: 14/807,937

(22) Filed: Jul. 24, 2015

(65) Prior Publication Data
US 2017/0026812 A1    Jan. 26, 2017

(51) Int. Cl.
| | |
|---|---|
| *H04W 4/18* | (2009.01) |
| *H04W 68/00* | (2009.01) |
| *H04W 8/00* | (2009.01) |
| *G06Q 20/18* | (2012.01) |
| *G06Q 30/02* | (2012.01) |
| *H04W 8/20* | (2009.01) |
| *G06F 21/84* | (2013.01) |
| *G06F 3/14* | (2006.01) |
| *G06Q 30/06* | (2012.01) |

(52) U.S. Cl.
CPC .............. *H04W 4/18* (2013.01); *G06Q 20/18* (2013.01); *G06Q 30/0255* (2013.01); *H04W 8/005* (2013.01); *H04W 68/00* (2013.01); *G06F 3/1454* (2013.01); *G06F 21/84* (2013.01); *G06Q 30/0643* (2013.01); *H04W 8/205* (2013.01)

(58) Field of Classification Search
None
See application file for complete search history.

(56) References Cited

U.S. PATENT DOCUMENTS

| | | | |
|---|---|---|---|
| 6,571,279 B1 | 5/2003 | Herz et al. | |
| 9,703,802 B1* | 7/2017 | Ward | G06F 17/30194 |
| 2002/0073331 A1 | 6/2002 | Candelore | |
| 2007/0136466 A1* | 6/2007 | Etelapera | G06F 3/1454 |
| | | | 709/225 |
| 2014/0019377 A1 | 1/2014 | Bhaumik et al. | |
| 2014/0120910 A1 | 5/2014 | Batada et al. | |
| 2014/0164111 A1* | 6/2014 | Rodriguez | G06Q 30/0255 |
| | | | 705/14.53 |
| 2014/0344062 A1 | 11/2014 | LaMont | |
| 2015/0079942 A1 | 3/2015 | Kostka et al. | |
| 2015/0178822 A1* | 6/2015 | Babiarz | G06Q 30/00 |
| | | | 705/26.7 |

OTHER PUBLICATIONS

PCT International Search Report for corresponding PCT Application No. PCT/US2016/043860, dated Oct. 12, 2016, 4 pages.

* cited by examiner

*Primary Examiner* — Vinncelas Louis
(74) *Attorney, Agent, or Firm* — Dority & Manning, P.A.

(57) ABSTRACT

Systems and method of providing personalized data by a public device are provided. In particular, a beacon device associated with a public computing device, such as a kiosk, can broadcast beacon data associated with the public computing device. The beacon data can include an identifier associated with the public device. The beacon data can be detected by a user device proximate the beacon device. The user device can then send user data to a remote computing device associated with the public device. The remote computing device can then update at least a portion of information to be provided by the public device based at least in part on the user data.

20 Claims, 5 Drawing Sheets

SYSTEMS AND METHODS FOR PERSONALIZING PUBLIC DEVICES

FIELD

The present disclosure relates generally to public devices and more particularly to personalizing information provided by a public device.

BACKGROUND

In recent years, location-based functionality associated with mobile computing devices has become increasingly popular. Location-based functionality can allow a user device, such as a smart phone, tablet or wearable computing device, to receive information and to perform actions associated with the information. Such location-based functionality can be implemented, for instance, through the use of beacon devices. Beacon devices are a recent technology that can be used, for instance, in determining proximity and location. A beacon device is a small, low cost, self-contained device that can periodically provide (e.g. broadcast using a short range wireless communication technology) information. A user device can receive the information and use the knowledge of the identity of the beacon device and/or proximity to the beacon device for various purposes, including determining location, communication, asset tracking, retail identification, safety, etc.

Beacon devices can be used in conjunction with public computing devices to provide location-based functionality. Public computing devices can include, for instance, kiosks, vending machines, display boards, or any other suitable public computing device capable of being accessed by more than one user.

SUMMARY

Aspects and advantages of embodiments of the present disclosure will be set forth in part in the following description, or may be learned from the description, or may be learned through practice of the embodiments.

One example aspect of the present disclosure is directed to a computer implemented method of providing personalized data by a public device. The method includes receiving, by one or more computing devices, user data from a user device. The user data is provided to the one or more computing devices responsive to the detection of beacon data by the user device. The beacon data is broadcast by a beacon device. The beacon device is associated with a public device. The method further includes identifying, by the one or more computing devices, personalized information associated with a user of the user device based at least in part on the received user data. The method further includes updating, by the one or more computing devices, at least a portion of information to be provided by the public device based at least in part on the personalization information.

Other aspects of the present disclosure are directed to systems, apparatus, tangible, non-transitory computer-readable media, user interfaces and devices for providing personalized data by public devices.

These and other features, aspects, and advantages of various embodiments will become better understood with reference to the following description and appended claims. The accompanying drawings, which are incorporated in and constitute a part of this specification, illustrate embodiments of the present disclosure and, together with the description, serve to explain the related principles.

BRIEF DESCRIPTION OF THE DRAWINGS

Detailed discussion of embodiments directed to one of ordinary skill in the art is set forth in the specification, which makes reference to the appended figures, in which.

DETAILED DESCRIPTION

Reference will now be made in detail to embodiments, one or more examples of which are illustrated in the drawings. Each example is provided by way of explanation of the embodiments, not limitation of the invention. In fact, it will be apparent to those skilled in the art that various modifications and variations can be made to the embodiments without departing from the scope or spirit of the present disclosure. For instance, features illustrated or described as part of one embodiment can be used with another embodiment to yield a still further embodiment. Thus it is intended that aspects of the present disclosure cover such modifications and variations.

Overview

Example aspects of the present disclosure are generally directed to personalizing interactions with a public device. As used herein, a public device can be a computing device located in a public space that is available for access by more than one user. For instance, a public device can be a kiosk located in a restaurant or business, a computing device located in a library or computer lab, a check-in station at an airport, a display board located in a public space, a public vending machine, a music player or various other suitable public devices.

Public devices generally do not automatically provide personalized information tailored to a particular user. For instance, when a user approaches a public device, the user must often interact with the device to make the user's preferences known to the device. For instance, some public devices require a user to "login" to a profile associated with the public device to make user preferences known. However, this can be inefficient and time consuming.

Conventional techniques for automatically personalizing a public device can include a user providing a vector of personalization information (e.g. favorite stores, food preferences, movie preferences, etc.) to a nearby public device. However, such techniques can require a user to provide to the public device information that is not relevant to the public device. Further techniques can include using camera-based imaging to personalize content. For instance, a camera in a public device at a bank can recognize that a customer is between the ages of fifty and sixty (e.g. using facial recognition or other techniques) and provide the user with information relating to retirement planning. Such techniques can be unduly intrusive, and can be performed without consent of the user.

According to example embodiments of the present disclosure, a public device can provide personalized content to the user based on the user's consent. In particular, as the user interacts with the public device, a server associated with the public device can provide information to the user relating to previous interactions of the user with the public device. The public device can further record and store any current interactions between the user and the public device. In particular, as the user approaches the public device, the user's mobile device can prompt the user to grant permission to the public device to personalize the information provided. If the user grants permission, a server associated with the public device can update information to be displayed on the public device based at least in part on previous interactions of the user with the public device. In this manner, the personalization is performed with the consent of the user.

As indicated, in some embodiments, in order to obtain the benefits of the techniques described herein, the user may be required to allow the collection and analysis of location information associated with the user or the user device and/or information associated with the user's interactions with a public device. Therefore, in some embodiments, users may be provided with an opportunity to control settings associated with whether programs or features collect such information. If the user does not allow collection and use of such signals, then the user may not receive the benefits of the techniques described herein. For instance, changes to these settings can prevent the personalization of interactions with public devices. The user can also be provided with tools to revoke or modify consent. In addition, in some embodiments, certain information or data can be treated in one or more ways before it is stored or used, so that personally identifiable information is removed.

In example embodiments, a beacon device located in or near a public device can broadcast beacon data. A beacon device can be a small, low cost, self-contained device that can periodically provide (e.g. broadcast using a short range wireless communication technology) information. The beacon data can include an identifying signal of the beacon device. In example embodiments, the beacon data may also include data indicative of the public device. For instance, the beacon data may include a universally unique identifier (UUID), a uniform resource locator (URL), a sequence of bytes, an encrypted identifier, a media access control (MAC) address, internet protocol (IP) address, host name etc. associated with the public device. In the instance where the data indicative of the public device includes a URL, the URL can specify one or more characteristics associated with the public device. For instance, a URL associated with a kiosk in a grocery store can specify a domain of the grocery store, and the particular kiosk.

In alternative embodiments, a public device and/or an identifying signal associated with a public device can be associated with a particular geographic location. For instance, a public device and/or identifying signal may be associated with latitude/longitude coordinates, a GPS-position a geographic region, and/or various other suitable location indicators. Such data can be stored by a remote computing device, such as a server. When a user device travels within a threshold distance of the geographic location, the user device may provide user data to a remote computing device associated with the public device and/or identifying signal. In this manner, a beacon device associated with the public device may not be needed to provide personalized data by the public device.

A user device proximate the beacon device can scan for and detect the beacon data. A user device can be, for instance, a smartphone, tablet, wearable computing device, laptop, or any other suitable computing device capable of being carried by a user while in operation. Once the beacon data has been detected, the user device can determine whether the public device has permission to display personalized information. For instance, the user device can provide for display a prompt to the user asking the user for permission. If the user grants permission, the user device can provide user data to a remote computing device (e.g. server) associated with the URL. In example embodiments, the user data can include a request for a web cookie from the server and/or an identifying signal associated with the user device.

In alternative embodiments, the user device may provide the beacon identifier to a server associated with the beacon device. The server can then identify the domain and public device associated with the beacon device based at least in part on the received identifier, and provide an identifier of the public device to the user device. The user device can then provide the user data to the server associated with the public device.

As the user interacts with the public device, the public device can request, from the server, data associated with the interaction, and the server can provide the requested data to the public device. The server can then record information indicative of the interaction and associate the information with the cookie and/or the identifying signal associated with the user device. For instance, if a user searches for produce in a first interaction with a kiosk at a grocery store, the server can record information indicative of the search, and associate the recorded information with the cookie.

When the user returns to the public device (or a different public device associated with the same business, for instance), the user device can again detect the beacon data being broadcast by beacon device associated with the public device. The user device can again prompt the user to grant permission to the public device. If the user gives permission, the user device may then identify the previously received cookie based on the beacon data, and provide the cookie to the server. The server can then identify the information associated with the user's previous interactions with the public device based on the cookie, and update at least a portion of the information to be provided by the public device based on the identified information. The public device can then provide (e.g. provide for display, play an audio file, etc.) data associated with the updated information. For instance, in continuing the above example, on a subsequent visit to the kiosk at the grocery store by the user, the server may, responsive to receiving the cookie from the user device, update information to be displayed by the public device based on the user's previous search for produce on the public device. The public device may then display information related to produce. In this manner, on the subsequent visit, the user does not have to again search for produce.

In example embodiments, if the user grants permission to the public device (e.g. kiosk) once, the user device can store the permission such that on a subsequent visit to the kiosk (or a different kiosk associated with the same domain), the user device can bypass asking for permission. In this manner, a user may only have to give permission to the kiosk once. It will be appreciated that, in such embodiments, the user may revoke the permission as desired at any time. If the user revokes permission, any personalized data associated with the user may be removed from the server associated with the kiosk.

The server may associate any interactions between the user and the kiosk during the subsequent visit with the cookie and store information indicative of the interactions at the server. In this manner, the server may accumulate data over time as the user interacts with the kiosk over multiple visits, and upon each visit, the server may update at least a portion of the information to be displayed by the kiosk, such that the kiosk may display personalized data for the user.

In example embodiments, when a user device requests a cookie from the server (e.g. during the first visit by the user to the public device) or when the user device provides a cookie to the server (e.g. during subsequent visits to the public device), the server can create or restore an interaction session associated with the user and the public device. During the interaction session the server can record the interactions of the user with the public device and associate the interactions with the cookie. Such an interaction session can last for the duration of the interaction between the user and the public device. The interaction session can then expire when the user ceases interacting with the public device. For instance, the interaction session may expire as a user leaves the vicinity of the public device. In particular, the user device may send a "Nil" cookie to the server when the user device can no longer detect the beacon data associated with the public device, and the server can cause the session to expire responsive to receiving the "Nil" cookie. In alternative embodiments, the session may expire based at least in part on an elapsed amount of time. For instance, the session may expire if the time since the last user interaction with the public device reaches a threshold time. In yet further alternative embodiments, the interaction session may expire based on a manual input to end the session by the user. When the interaction session expires, the server can update the information to be provided by the public device, such that any information associated with the user is no longer provided by the public device. The server can further cease recording interactions with the public device.

In example embodiments, a public device may personalize information for multiple users simultaneously proximate a public device. For instance, a public device in a gymnasium may allow users to select music to play over speakers in the gymnasium. The public device may record a user's selections and store them such that the selected music automatically plays when the user enters the gymnasium. When multiple users are using the gymnasium simultaneously, the public device may play a combined playlist that includes songs previously selected by each user currently in the gymnasium. As another example, if two users are simultaneously proximate a display board at a subway station, the display board may simultaneously display subway routing information relating to both users based at least in part on previous interactions of each user with the display board.

In alternative embodiments, information indicative of a user's interactions with a public device can be stored in a memory of the user device. In such embodiments, a public device may provide the information to the user device. For instance, the public device may provide the information as the user interacts with the public device, or the public device may provide the information as the user is leaving the vicinity of the public device. On subsequent visits to the public device, the user device can provide the accumulated information to the public device, and the public device may then provide for display personalized data associated with the personalization information.

Example Beacon Device Systems

Figure 1:
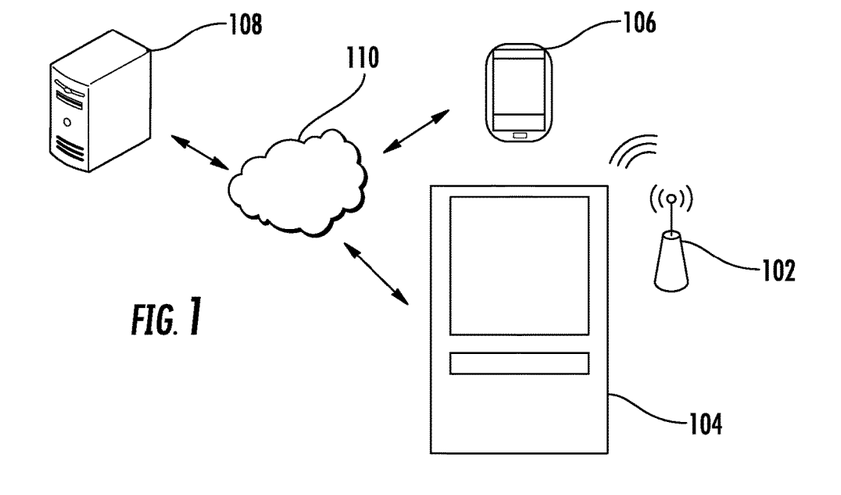
FIG. 1 depicts an example system for providing personalized data by a public device according to example embodiments of the present disclosure.

FIG. 1 depicts an example system 100 for personalizing public devices according to example embodiments of the present disclosure. System 100 can include one or more beacon devices, such as beacon device 102 and an associated public device 104. As indicated above, public device 104 can be a kiosk, vending machine, display board, music player, or any other suitable computing device capable of being accessed my more than one user. System 100 can further include at least one user device 106 and at least one server 108.

Beacon device 102 can be a computing device configured to broadcast messages (e.g. beacon data). As indicated above, beacon device 102 can be a small, low cost, self-contained device that can periodically provide (e.g. broadcast using a short range wireless communication technology) information. Beacon device 102 can be located proximate public device 104. In example embodiments, beacon device 102 can be located within public device 104.

User device 106 can be configured to scan for and detect beacon data. User device 106 can be, for instance, a smartphone, tablet, wearable computing device, or any other suitable mobile computing device capable of being carried by a user while in operation.

In example embodiments, the beacon data can be used for the purpose of being "noticed" without requiring a two-way connection. Thus, in such embodiments, the entirety of the interaction between the beacon device 102 and user device 106 can be performed without requiring a connection between the user device and the beacon device or a connection between the beacon device and the server. Instead, all relevant information for the interaction is contained within the data emitted by the beacon device. Limiting beacon device interaction to the broadcasting of data can provide a nominal behavior that allows energy consumption and service life to be modeled and reasonably predicted. In alternative embodiments, beacon device 102 can include computing devices that use two-way communication. For instance, a BLE beacon device using active scanning can implement two-way communication.

As an example, beacon device 102 can broadcast the beacon data using short range wireless communication technologies such as, for example, Bluetooth, Bluetooth low energy, ZigBee, Near Field Communication (NFC), WiFi Direct, or other technologies. For instance, in embodiments in which NFC technologies are used, an NFC tag can store an NFC Data Exchange Format (NDEF), which can be configured to support the use of URLs. Furthermore, although short range wireless communication technologies are provided as an example, any communication method can be used to transmit data from the beacon device 102 to user device 106, including, for example, wired connections, general radio frequency communication, optical communication, infrared communication, magnetic communication, or other communication methods.

In embodiments in which beacon device 102 employs Bluetooth low energy (BLE) technology for broadcasting, each message can carry a 31-byte payload. As noted, messages can be broadcast events that are capable of being received and processed by any listening device (e.g. user device). Further, the above example implementation using BLE technology is provided as an example only. Other suitable communication protocols having different frame formats or channel assignments can be used, as well. In addition, as certain protocols are modified or replaced over time, the present disclosure can be easily adapted for implementation using such new protocols.

Server 108 can be configured to communicate with public device 104 and user device 106 over a network 110. As an example, server 108 can be one or more server computing devices. In the instance that a plurality of server computing devices are used, the server computing devices can be arranged according to any suitable computing architecture, including sequential computing architectures, parallel computing architectures, or combinations thereof.

Network 110 can be any type of communications network, such as a local area network (e.g., intranet), wide area network (e.g., Internet), or some combination thereof and can include any number of wired or wireless links. In general, communication between the server 108, public device 104, and user device 106 can be carried via any type of wired and/or wireless connection, using a wide variety of communication protocols (e.g., TCP/IP, HTTP, SMTP, FTP), encodings or formats (e.g., HTML, XML), and/or protection schemes (e.g., VPN, secure HTTP, SSL).

Furthermore, although user device 106 and public device 104 are shown as communicating directly with the server 108 over network 110, there may be any number of intervening devices between user device 106 and server 108 and/or between public device 104 and server 108. As an example, in some embodiments, groups of user devices can be organized in a network (e.g. a mesh network) and can relay messages back and forth from a particular user device to server 108.

Figure 2:
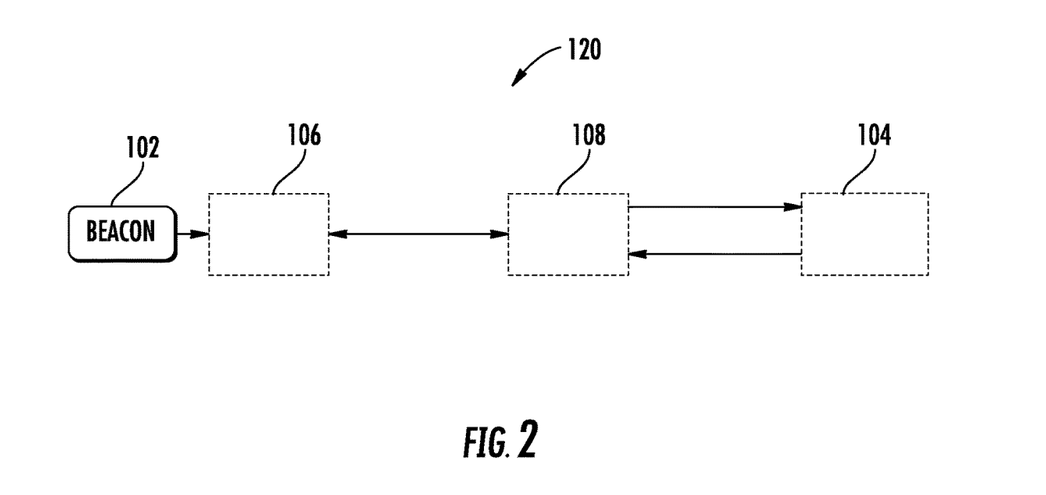
FIG. 2 depicts an example system for providing personalized data by a public device according to example embodiments of the present disclosure.

FIG. 2 depicts an example system 120 for personalizing public devices according to example embodiments of the present disclosure. System 120 can be a particular implementation of system 100 and can include user device 106, server 108, public device 104, and a beacon device 102. User device 106 and public device 104 can communicate with server 108 over a network, such as network 110.

According to example embodiments of the present disclosure, beacon device 102 can broadcast (e.g. using short range wireless communication technology) beacon data, which can be detected by user device 106. The beacon data can include data indicative of an identity of beacon device 102 (e.g. a universally unique identifier (UUID), a URL, a sequence of bytes, an encrypted identifier, etc.). In example embodiments, the beacon data can further include data indicative of the identity of a public device (e.g. public device 104) associated with beacon device 102. Similar to the beacon identification data, the public device identification data can include a universally unique identifier (UUID), a URL, a sequence of bytes, an encrypted identifier, etc. As described above, in the instance where the public device identification data comprises a URL, the URL can specify a domain associated with the public device and the device itself. For instance, a URL associated with a kiosk located at a grocery store may specify a domain name of "www.grocery.com" and the particular kiosk at "/storefront=52_Alder_Ave."

Responsive to detecting the beacon data, user device 106 can determine whether the user of the user device has granted the domain permission to personalize the content provided by the public device. In example embodiments, the user device can provide for display a notification prompting the user to grant permission. If the user grants permission, the user device can provide user data to a server associated with the public device (e.g. server 108). For instance, the user device can request a cookie from server 108 by providing a HyperText Transfer Protocol (HTTP) request to the URL.

In alternative embodiments, the user device can provide the beacon ID and an identifier associated with the user device to a remote computing device (e.g. server), and the remote computing device can identify the URL associated with the public device. The remote computing device may then provide the URL to the user device, or provide the user identifier to server 108.

Upon receiving the user data (e.g. the cookie request), server 108 can create a web cookie and provide the web cookie to the user device. Server 108 can then associate the cookie with the user device. As the user interacts with public device 104, server 108 can associate the interaction with the cookie. For instance, if the interaction includes the user inputting a search term, server 108 can associate the search term with the user's cookie.

When the user returns to the same public device (or another public device associated with the same domain), server 108 can update information displayed by public device 104 to include information relative to the previous search term. In particular, as the user approaches the same public device, the user device can again detect the beacon data broadcast by the beacon device. The user device can then provide data indicative of the user profile (e.g. the cookie) to server 108. Server 108 may then identify the information (e.g. personalization information) that was previously associated with the cookie (e.g. the search term). Based on the identified personalization information, server 108 can update at least a portion of information provided by public device 104 to include information relating to the personalization information. For instance, if the search term previously input by the user specified a particular movie, server 108 can update the information displayed by public device 104 to include information relating to the movie, or similar movies.

Figure 3:
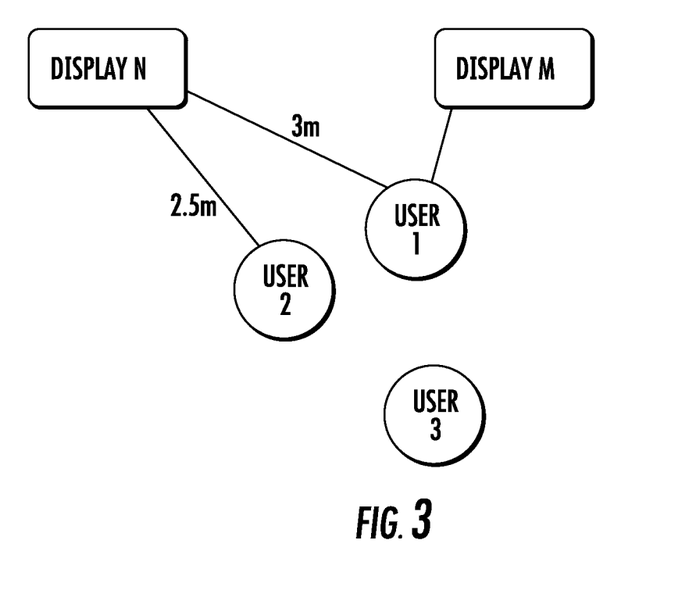
FIG. 3 depicts an example system for providing personalized data by a public device in the presence of multiple users according to example embodiments of the present disclosure.

FIG. 3 depicts an example system for personalizing data provided by public devices according to example embodiments of the present disclosure. In particular, FIG. 3 depicts two public devices (Display M and N), and three users (Users 1-3) proximate the public devices. In example embodiments, an interaction session can be created for one or more users proximate a public device. As indicated above, an interaction session can be created by a server associated with the public device responsive to receiving user data from a user device. The interaction session can span the duration of the interaction between the user and the public device, and during the interaction session, the server can record the interactions, and store information indicative of the interactions in association with the user data. During the interaction session, the server can further update at least a portion of information to be provided by the public device based at least in part on any previous interactions between the user and the public device.

In example embodiments, an interaction session can be created when a user device is located less than a threshold distance from a public device. In further example embodiments, if there are multiple users proximate a public device, an interaction session can be created for the user closest to the public device. For instance, as shown in FIG. 3, users 1-3 are located proximate display M and N. The distance between user 2 and display N is 2.5 meters, and the distance between user 1 and display N is 3 meters. Accordingly, an interaction session between user 2 and display N can be created. As user 1 is the closest user to Display M, and interaction session can be created between user 1 and display M.

In particular, when a user device detects beacon data associated with a public device, the user device can detect a location of the public device relative to the user device. The relative location can be determined, for instance, based at least in part on a received signal strength indication (RSSI) of the beacon data detected by the user device. As described above, the user device can then provide user data to a server associated with the public device. In example embodiments, the user data can include the determined relative location. The server can then compare the relative location against the relative location of any other user device from which user data has been received to determine for which user device an interaction session should be created.

As described above, in alternative embodiments, if two or more users are equally distant from a public device, an interaction session can be created simultaneously for the two or more users. In this manner, the server associated with the public device may update at least a portion of information to be provided by the public device based at least in part on previous interactions between each of the two or more users and the public device.

As indicated above, an interaction session can span for the duration of the interactions between the user and the public device. Accordingly, an interaction session can expire when the user ceases interacting with the public device. When an interaction session expires for instance, the server may update the information to be provided by the public device to remove any personalized information associated with the user. The server may further cease recording interactions associated with the public device.

In example embodiments, various signals may trigger the expiration of an interaction session. For instance, an interaction session may expire when a user travels a threshold distance from the public device. In this manner, when the distance between the user device and the public device reaches the threshold, the user device can send an end session signal to the server instructing the server to end the interaction session. As another example, an interaction session may expire based on the elapsed time since the last interaction (e.g. session time out). For instance, an interaction session may expire if no interactions occur between the user and the public device for a period of about 10 seconds, about 20 seconds, about 30 seconds, or various other suitable time periods. As used herein, the term "about," when used in reference to a numerical value, is intended to refer to within 40% of the numerical value.

As yet another example, a user may manually input an end session signal. In this manner, the user may instruct the public device that the user is finished interacting with the public device.

In example embodiments, user consent may be required for an interaction session to be created. For instance, responsive to detecting beacon data associated with a public device, the user device may prompt the user to give consent. In particular, the user device may provide for display one or more notifications prompting the user to grant permission to the domain associated with the public device to personalize data provided by the public device. If the user does not grant permission, the user will remain anonymous to the public device. If the user does grant permission, the user device can send user data to the server, and the server can create an interaction session.

The one or more notifications provided for display may, in example embodiments, include multiple options, such that the user may grant permission for a single instance or preemptively grant permission in future instance as well. If the user grants permission for the single instance, the user device will prompt the user's consent every time the user device detects beacon data associated with the public device. If the user grants permission for future instances, the user device can bypass gaining the user's permission on subsequent visits by the user to the public device. In alternative embodiments, a user may select an option to grant permission to all domains (e.g. such that no permission need be granted). It will be appreciated that the user may revoke consent and/or permissions as desired at any time. As indicated above, if the user revokes consent and/or permissions, any personalized data associated with the user may be removed by the server.

The one or more notifications provided for display may further include a visibility factor. The visibility factor may be indicative of how visible the public device is. For instance, if the public device is a large digital billboard in an urban environment, it may have a high visibility factor. In this manner, the user can decide whether to allow personalized content to be displayed on the billboard based on the amount of people who may also be able to view the personalized information.

Example Methods of Personalizing Information Provided By A Public Device

Figure 4:
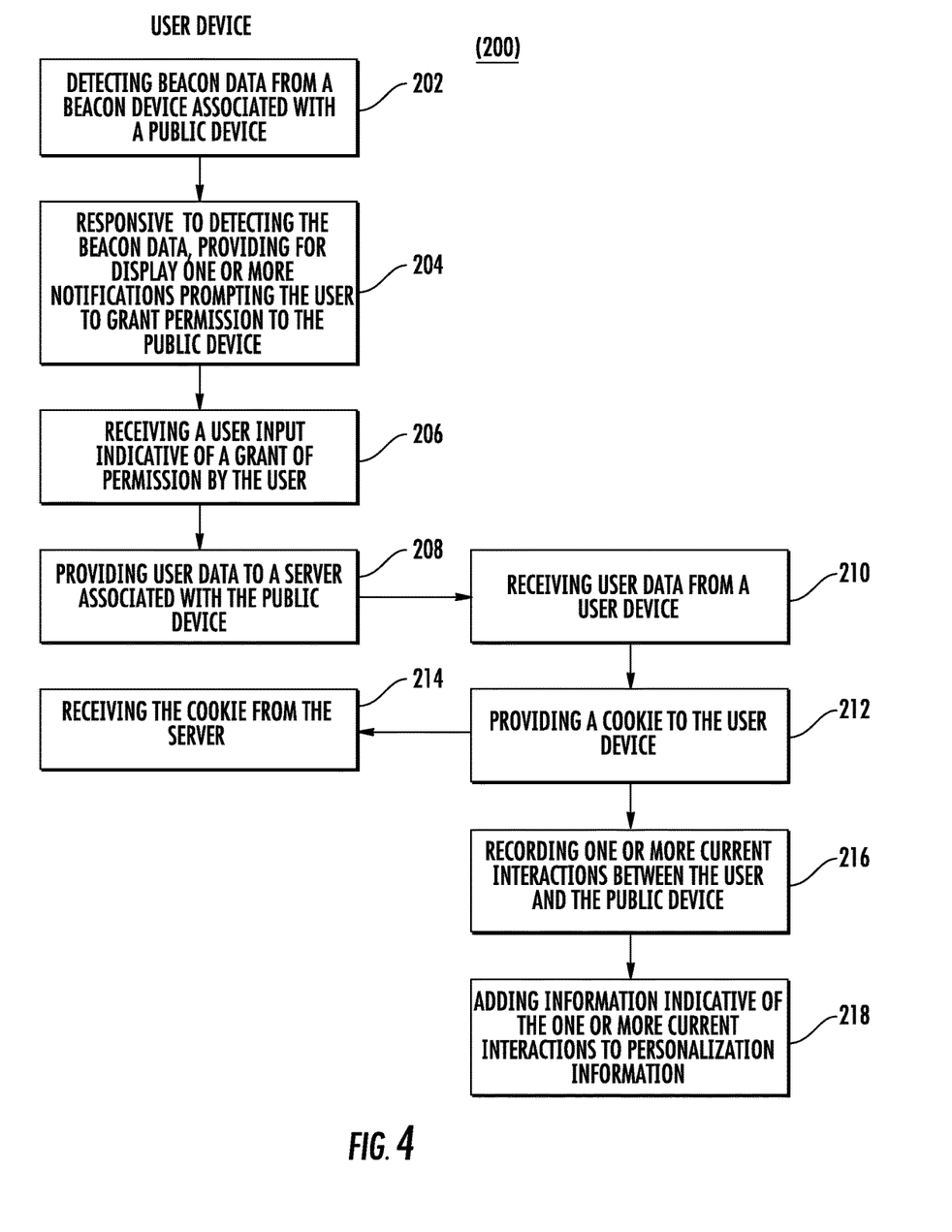
FIG. 4 depicts a flow diagram of an example method of providing personalized data by a public device according to example embodiments of the present disclosure.

FIG. 4 depicts a flow diagram of an example method (200) of personalizing data provided by a public device according do example embodiments of the present disclosure. Method (200) can be implemented by one or more computing devices, such as one or more of the computing devices depicted in FIG. 6. In addition, FIG. 4 depicts steps performed in a particular order for purposes of illustration and discussion. Those of ordinary skill in the art, using the disclosures provided herein, will understand that the steps of any of the methods discussed herein can be adapted, rearranged, expanded, omitted, or modified in various ways without deviating from the scope of the present disclosure.

At (202), method (200) can include detecting, by a user device, beacon data from a beacon device. The beacon device can be associated with a public device. For instance, the beacon device can be located proximate the public device, or the beacon device can be located within the public device. The beacon data can include a beacon ID and/or data indicative of an identity of the public device (e.g. a URL associated with the public device).

At (204), method (200) can include, responsive to detecting the beacon data, providing for display, by the user device, one or more notifications. For instance, the one or more notifications can include a prompt asking for the user's permission for the public device to personalize provided data. In example embodiments, the one or more notifications may also include a visibility factor associated with the public device.

In example embodiments, if the user has previously granted permission to the public device (or a different public device associated with the same domain), the user device may bypass providing the notification asking the user's permission. In this manner, method (200) may bypass (204) and (206) and proceed to (208).

At (206), method (200) can include receiving, by the user device, an input from the user. The input can be indicative of a grant of permission by the user allowing the public device to personalize data.

Upon receiving the grant of permission, method (200) can include providing, by the user device, user data to a remote computing device (e.g. server) associated with the public device (208). For instance, the user data can be sent to the server specified by the URL contained in the beacon data.

In example embodiments, the user data can include a request for a cookie from the server. At (210), method (200) can include receiving, by the server, the user data from the user device. At (212), method (200) can include, providing, by the server, a cookie to the user device. At (214), method (200) can include receiving, by the user device, the cookie from the server. The user device can then associate the cookie with the server and store the cookie.

At (216), method (200) can include recording, by the server, one or more current interactions between the user and the public device. For instance, as indicated above, if a user searches for a particular movie on the public device, the search can be recorded by the server. At (218), method (200) can include adding, by the server, information indicative of the one or more current interactions to a personalization information database. The personalization information database can contain personalization information indicative of the one or more interactions. The personalization information can then be associated with the cookie.

Figure 5:
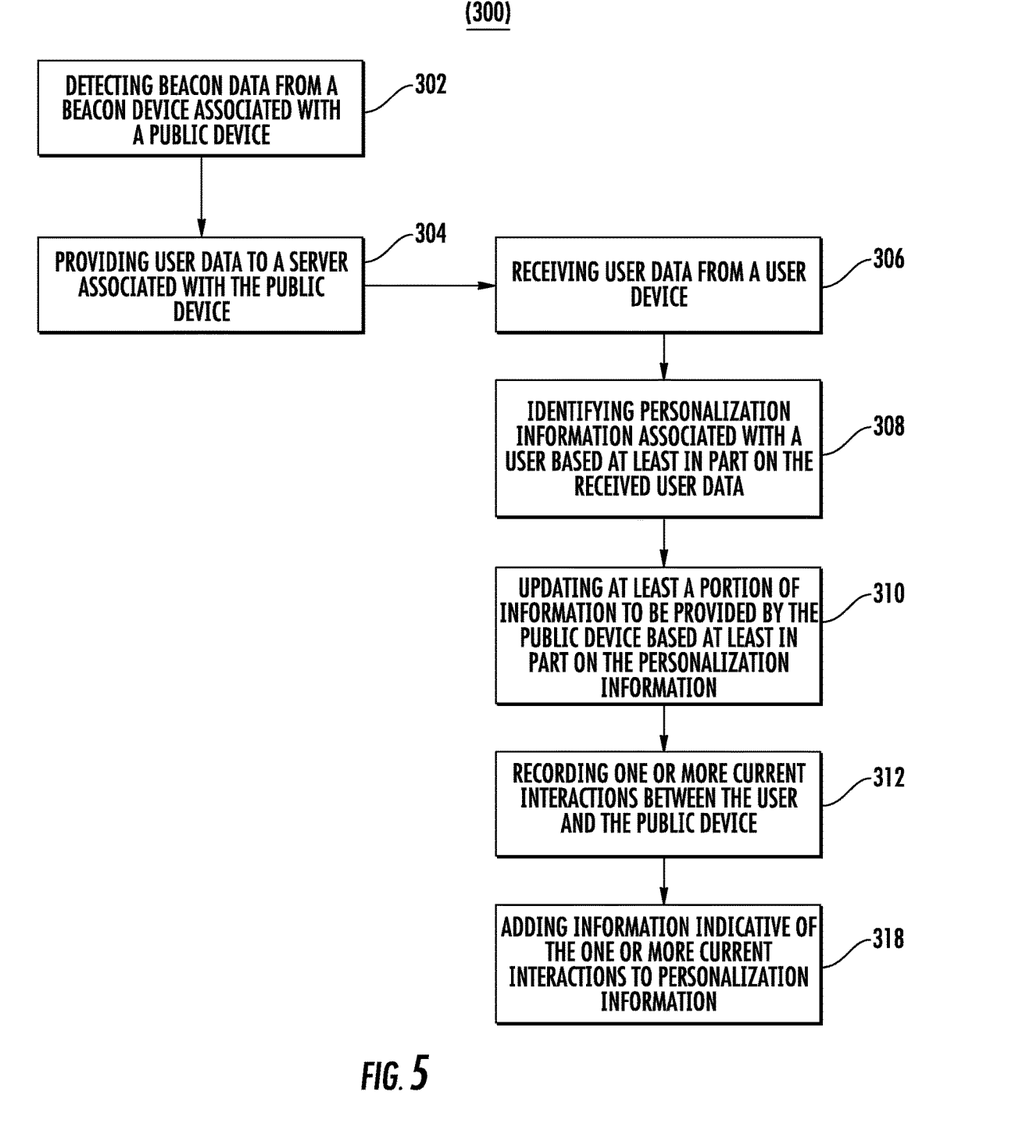
FIG. 5 depicts a flow diagram of an example method of providing personalized data by a public device according to example embodiments of the present disclosure.

As indicated above, on a subsequent visit to the public device by the user, the server can use the personalization information to update at least a portion of information to be provided by the public device. For instance, FIG. 5 depicts a flow diagram of an example method (300) of personalizing data provided by a public device. At (302), method (300) can include detecting, by the user device, beacon data being broadcast by a beacon device. The beacon data can include the beacon ID and/or data indicative of an identity of the public device (e.g. a URL associated with the public device).

At (304), method (300) can include providing, by the user device, user data to the server associated with the public device. For instance, the user data can again be sent to the server specified by the URL contained in the beacon data. On the subsequent visit, the user data may contain the cookie previously received from the server (e.g. in (214) of method (200)).

At (306), method (300) can include receiving, by the server, the user data from the user device. At (308), method (300) can include identifying, by the server, personalization information associated with the user. In particular, the server can identify the personalization information based at least in part on the received user data (e.g. the cookie). As indicated above, the personalization information can be information stored by the server indicative one or more previous interactions between the user and the public device. For instance, if the public device is a kiosk used to order food at a restaurant, the personalization information can include information indicative of one or more previous food orders made by the user.

At (310), method (300) can include updating, by the server, at least a portion of information to be provided by the public device based at least in part on the identified personalization information. In continuing the above example regarding the kiosk at the restaurant, the server may update the information provided by the public device such that the public device displays information relating to one or more of the user's previous orders without the user having to input any information. As another example, if the public device is a music player (e.g. a jukebox), the server may update the information provided by the music player, such that the music player automatically plays one or more songs previously selected by the user.

At (312), method (300) can include recording, by the server, one or more current interactions between the user and the public device. At (314), method (300) can include adding, by the server, information indicative of the one or more current interactions to the personalization information database, such that on subsequent visits, the server may update the information to be provided by the public device to include information indicative of the current interactions.

Example Computing System for Providing Beacon-based Notifications

Figure 6:
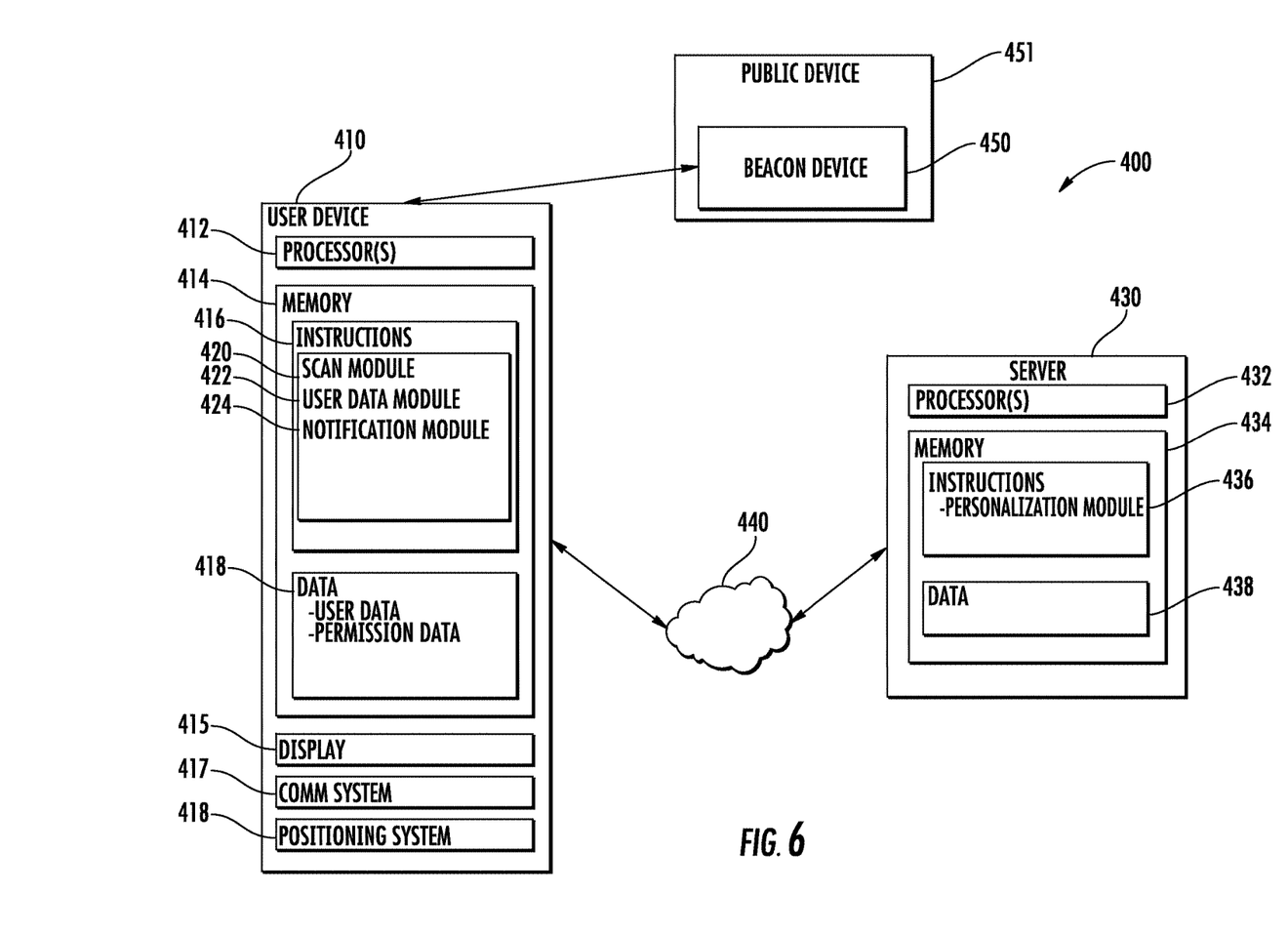
FIG. 6 depicts an example computing system according to example embodiments of the present disclosure.

FIG. 6 depicts an example computing system 400 that can be used to implement the methods and systems of personalizing data provided by a public device according to example aspects of the present disclosure. System 400 can include a user device 410. User device 410 can be any suitable type of mobile computing device, such as a smartphone, tablet, cellular telephone, wearable computing device, or any other suitable mobile computing device capable of being carried by a user while in operation. User device 410 can include one or more processor(s) 412 and one or more memory devices 414.

The one or more processor(s) 412 can include any suitable processing device, such as a microprocessor, microcontroller, integrated circuit, logic device, one or more central processing units (CPUs), graphics processing units (GPUs) dedicated to efficiently rendering images or performing other specialized calculations, and/or other processing devices, such as a system on a chip (SoC) or a SoC with an integrated RF transceiver. The one or more memory devices 414 can include one or more computer-readable media, including, but not limited to, non-transitory computer-readable media, RAM, ROM, hard drives, flash memory, or other memory devices.

The one or more memory devices 414 can store information accessible by the one or more processors 412, including instructions 416 that can be executed by the one or more processors 412. For instance, the memory devices 414 can store instructions 416 for implementing one or more modules configured to implement a scan module 420, a user data module 422, a notification module 424, and/or various aspects of any of the methods disclosed herein. Scan module 420 can be configured to scan for one or more beacon devices. User data module 422 can be configured to provide user data to a remote computing device (e.g. server 430). Notification module 424 can be configured to generate and provide for display one or more notifications associated with a beacon device.

The one or more memory devices 414 can also include data 418 that can be retrieved, manipulated, created, or stored by the one or more processors 412. The data can include, for instance, user data, permission data, and/or other information.

It will be appreciated that the term "module" refers to computer logic utilized to provide desired functionality. Thus, a module can be implemented in hardware, application specific circuits, firmware and/or software controlling a general purpose processor. In one embodiment, the modules are program code files stored on the storage device, loaded into one or more memory devices and executed by one or more processors or can be provided from computer program products, for example computer executable instructions, that are stored in a tangible computer-readable storage medium such as RAM, ROM, flash memory, hard disk or optical or magnetic media. In example embodiments, modules can be implemented in hardware independent of the one or more processors. For instance, a module can be implemented using a WiFi and/or Bluetooth transceiver, module or microcontroller. When software is used, any suitable programming language or platform can be used to implement the module.

User device 410 can include various input/output devices for providing and receiving information from a user, such as a touch screen, touch pad, data entry keys, speakers, and/or a microphone suitable for voice recognition. For instance, user device 410 can have a display 415 for presenting a user interface to a user. User device 410 can further include a communication system 417. Communication system 417 can be used to communicate with a beacon device, such as beacon device 450.

User device 410 can further include a positioning system 419. The positioning system 419 can be any device or circuitry for determining the position of remote computing device. For example, the positioning device can determine actual or relative position by using a satellite navigation positioning system (e.g. a GPS system, a Galileo positioning system, the GLObal Navigation satellite system (GLONASS), the BeiDou Satellite Navigation and Positioning system), an inertial navigation system, a dead reckoning system, based on IP address, by using triangulation and/or proximity to cellular towers or WiFi hotspots, WiFi time-of-flight, and/or other suitable techniques for determining position.

User device 410 can also include a network interface used to communicate with one or more remote computing devices (e.g. server 430) over a network 440. The network interface can include any suitable components for interfacing with one more networks, including for example, transmitters, receivers, ports, controllers, antennas, or other suitable components.

In some implementations, the user device can be in communication with a remote computing device, such as a server 430 over network 440. Server 430 can be one or more computing devices, such as described above with regard to server 108 in FIG. 1.

Similar to the user device 410, server 430 can include one or more processor(s) 432 and a memory 434. The one or more processor(s) 432 can include one or more central processing units (CPUs), and/or other processing devices. The memory 434 can include one or more computer-readable media and can store information accessible by the one or more processors 432, including instructions 436 that can be executed by the one or more processors 432, and data 438. For instance, the memory 434 can store instructions 436 for implementing a personalization module for identifying personalization information associated with a user and updating at least a portion of information to be provided by a public device (e.g. public device 451) based at least in part on the personalization information.

Server 430 can also include a network interface used to communicate with computing device 410 over network 440. The network interface can include any suitable components for interfacing with one more networks, including for example, transmitters, receivers, ports, controllers, antennas, or other suitable components.

Network 440 can be any type of communications network, such as a local area network (e.g. intranet), wide area network (e.g. Internet), cellular network, or some combination thereof. Network 440 can also include a direct connection between user device 410 and server 430. Network 440 can include any number of wired or wireless links and can be carried out using any suitable communication protocol.

System 400 can further include one or more beacon devices, such as beacon device 450 associated a public device 451. Beacon device 450 can broadcast messages such as described with regard to beacon device 102 in FIG. 1. Beacon device 450 can be implemented using any suitable computing device(s). Although only one beacon device is depicted in FIG. 10, it will be appreciated by those skilled in the art that any suitable number of beacon devices can be included in system 400.

Beacon device 451 can be associated with a public device 451. Public device 451 can be a computing device, such as public device 104 in FIG. 1, having one or more processor(s) and a memory. The one or more processor(s) can include one or more central processing units (CPUs), and/or other processing devices. The memory can include one or more computer-readable media and can store information accessible by the one or more processors, including instructions that can be executed by the one or more processors, and data.

The technology discussed herein makes reference to servers, databases, software applications, and other computer-based systems, as well as actions taken and information sent to and from such systems. One of ordinary skill in the art will recognize that the inherent flexibility of computer-based systems allows for a great variety of possible configurations, combinations, and divisions of tasks and functionality between and among components. For instance, server processes discussed herein may be implemented using a single server or multiple servers working in combination. Databases and applications may be implemented on a single system or distributed across multiple systems. Distributed components may operate sequentially or in parallel.

While the present subject matter has been described in detail with respect to specific example embodiments thereof, it will be appreciated that those skilled in the art, upon attaining an understanding of the foregoing may readily produce alterations to, variations of, and equivalents to such embodiments. Accordingly, the scope of the present disclosure is by way of example rather than by way of limitation, and the subject disclosure does not preclude inclusion of such modifications, variations and/or additions to the present subject matter as would be readily apparent to one of ordinary skill in the art.

What is claimed is:

1. A computer-implemented method of providing personalized data, the method comprising:

receiving, by one or more computing devices, user data from a user device within a threshold distance of a beacon device, the threshold distance based in part on a received signal strength of beacon data broadcast by the beacon device;

providing, by the one or more computing devices, for display by the user device and in response to detecting the beacon data, one or more notifications comprising prompting a user to grant permission to a public device to provide personalization information associated with the user of the user device and a visibility factor indicative of the visibility of the public device, wherein the visibility factor is based in part on a size of a display associated with the public device and an amount of people able to view the display associated with the public device;

receiving, by the one or more computing devices, from the user device, the user data when the user grants the permission to the public device, the user data received during an interaction session with the beacon data by the user device, wherein the beacon device is associated with the public device;

identifying, by the one or more computing devices, personalization information associated with the user of the user device based at least in part on the received user data, wherein the personalization information is indicative of one or more prior interactions of the user with the public device; and responsive to the interaction session expiring, updating, by the one or more computing devices, at least a portion of information to be provided by the public device based at least in part on the personalization information, the public device displaying the personalization information indicative of the one or more prior interactions of the user with the public device, wherein the updating comprises removing the personalization information associated with the user at the public device.

2. The computer-implemented method of claim 1, wherein the user data comprises a request for a web cookie to be associated with the user device.

3. The computer-implemented method of claim 1, wherein the user data comprises a web cookie associated with the user device.

4. The computer-implemented method of claim 1, wherein the personalization information comprises information manually input by the user.

5. The computer-implemented method of claim 1, wherein the at least a portion of information to be provided by the public device comprises information to be provided for display by the public device, the information being associated with the personalization information.

6. The computer-implemented method of claim 1, wherein the personalization information is further indicative of one or more prior interactions of the user with a second public device.

7. The computer-implemented method of claim 1, further comprising:
receiving, by the one more computing devices, information indicative of one or more current interactions of the user with the public device; and
adding, by the one or more computing devices, the information indicative of the one or more current interactions to the personalization information associated with the user.

8. The computer-implemented method of claim 1, further comprising:
receiving, by the one or more computing devices, second user data from a second user device;
identifying, by the one or more computing devices, second personalization information associated with a user of the second user device based at least in part on the second user data, the second personalization information indicative of one or more prior interactions of the user of the second user device with the public device; and
updating, by the one or more computing devices, at least a portion of information to be provided by the public device based at least in part on the second personalization information.

9. The computer-implemented method of claim 1, further comprising, responsive to receiving an end session signal, updating, by the one or more computing devices, at least a portion of information to be provided by the public device, such that the public device does not provide information associated with the personalization information.

10. The computer-implemented method of claim 9, wherein the end session signal is received from the user device when the user device travels outside the threshold distance from the beacon device.

11. The computer-implemented method of claim 9, wherein the end session signal is received from the public device based at least in part on an amount of time since the last interaction between the user and the public device.

12. A computing system, comprising:
one or more processors; and
one or more memory devices, the one or more memory devices storing computer-readable instructions that when executed by the one or more processors cause the one or more processors to perform operations, the operations comprising:
receiving user data from a user device within a threshold distance of a beacon device, the threshold distance based in part on a received signal strength of beacon data broadcast by the beacon device;
providing for display by the user device and in response to detecting the beacon data, one or more notifications comprising prompting a user to grant permission to a public device to provide personalization information associated with the user of the user device and a visibility factor indicative of the visibility of the public device, wherein the visibility factor is based in part on a size of a display associated with the public device and an amount of people able to view the display associated with the public device;
receiving from the user device, the user data when the user grants the permission to the public device, the user data received during an interaction session with the beacon data by the user device, wherein the beacon device is associated with the public device;
identifying personalization information associated with the user of the user device based at least in part on the received user data, wherein the personalization information is indicative of one or more prior interactions of the user with the public device; and
responsive to the interaction session expiring, updating at least a portion of information to be provided by the public device based at least in part on the personalization information, the public device displaying the personalization information indicative of the one or more prior interactions of the user with the public device, wherein the updating comprises removing the personalization information associated with the user at the public device.

13. The computing system of claim 12, wherein the operations further comprise:
receiving information indicative of one or more current interactions of the user with the public device; and
adding the information indicative of the one or more current interactions to the personalization information associated with the user.

14. The computing system of claim 12, further comprising, responsive to receiving an end session signal, updating, by the one or more computing devices, at least a portion of information to be provided by the public device, such that the public device does not provide information associated with the personalization information.

15. The computing system of claim 14, wherein the end session signal is received from the user device when the user device travels outside the threshold distance from the beacon device.

16. The computing system of claim 14, wherein the end session signal is received from the public device based at least in part on an amount of time since the last interaction between the user and the public device.

17. One or more tangible, non-transitory computer-readable media storing computer-readable instructions that when executed by one or more processors cause the one or more processors to perform operations, the operations comprising:

receiving user data from a user device within a threshold distance of a beacon device, the threshold distance based in part on a received signal strength of beacon data broadcast by the beacon device;

providing for display by the user device and in response to detecting the beacon data, one or more notifications comprising prompting a user to grant permission to a public device to provide personalization information associated with the user of the user device and a visibility factor indicative of the visibility of the public device, wherein the visibility factor is based in part on a size of a display associated with the public device and an amount of people able to view the display associated with the public device;

receiving from the user device, the user data when the user grants the permission to the public device, the user data received during an interaction session with the beacon data by the user device, wherein the beacon device is associated with the public device;

identifying, personalization information associated with the user of the user device based in part on the received user data, wherein the personalization information is indicative of one or more prior interactions of the user with the public device; and responsive to the interaction session expiring, updating at least a portion of information to be provided by the public device based at least in part on the personalization information, the public device displaying the personalization information indicative of the one or more prior interactions of the user with the public device, wherein the updating comprises removing the personalization information associated with the user at the public device.

18. The one or more tangible, non-transitory computer-readable media of claim 17, further comprising:

receiving an input from the user indicative of a revocation of the permission by the user to the public device; and providing one or more signals to a remote computing device indicative of the revocation.

19. The one or more tangible, non-transitory computer-readable media of claim 17, wherein the user data comprises a cookie, the cookie being used by a remote computing device to identify the personalization information associated with the user data, and to update at least a portion of information to be provided by the public device based at least in part on the personalization information.

20. The one or more tangible, non-transitory computer-readable media of claim 19, wherein the personalization information is further indicative of one or more prior interactions between the user and a second public device.

* * * * *